US007086413B2

(12) United States Patent
Yu et al.

(10) Patent No.: US 7,086,413 B2
(45) Date of Patent: Aug. 8, 2006

(54) BI-DIRECTIONAL DAMPER VALVE FOR A HYDRAULIC LINE, POWER STEERING SYSTEM INCORPORATING THE DAMPER VALVE, AND METHODS OF USING SAME

(75) Inventors: Jinghong (John) Yu, Raymond, OH (US); Chad Gilsinger, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 215 days.

(21) Appl. No.: 10/808,749

(22) Filed: Mar. 25, 2004

(65) Prior Publication Data

US 2005/0211303 A1    Sep. 29, 2005

(51) Int. Cl.
*F16K 17/18* (2006.01)
*B62D 5/065* (2006.01)
(52) U.S. Cl. .................... 137/493.9; 137/493; 180/441
(58) Field of Classification Search ................ 137/493, 137/493.9, 512.5, 614.21, 601.21, 493.8; 180/441
See application file for complete search history.

(56) References Cited

U.S. PATENT DOCUMENTS

| 2,372,408 | A | * | 3/1945  | Trich ......................... 137/512.5 |
| 3,805,825 | A | * | 4/1974  | Lovingham .................. 137/512 |
| 3,850,195 | A | * | 11/1974 | Olsson ........................ 137/503 |
| 3,894,562 | A |   | 7/1975  | Moseley, Jr. et al. |
| 4,285,534 | A |   | 8/1981  | Katayama et al. |
| 4,736,962 | A |   | 4/1988  | Motrenec |
| 5,018,607 | A | * | 5/1991  | Hardtke et al. .......... 137/512.5 |
| 5,531,287 | A |   | 7/1996  | Sherman |
| 5,697,216 | A |   | 12/1997 | Phillips |
| 6,119,728 | A |   | 9/2000  | Seidel-Peschmann et al. |
| 6,164,320 | A | * | 12/2000 | Hamano et al. ......... 137/493.2 |
| 6,467,392 | B1| * | 10/2002 | Breuning et al. ........ 137/493.9 |

* cited by examiner

*Primary Examiner*—Stephen M. Hepperle
(74) *Attorney, Agent, or Firm*—Carrier, Blackman & Associates, P.C.; William D. Blackamn; Joseph P. Carrier

(57) ABSTRACT

A bi-directional damper valve is provided for connecting to a hydraulic line, to regulate fluid flow therethrough. The damper valve includes a main valve body having a flow passage formed therethrough, and the flow passage widens at central portion of the valve body to form a central chamber, which has valve seats formed at opposite ends thereof. The main valve body also has two bypass channels formed therein, which branch off the central chamber near the valve seats, and which selectively communicate with the flow passage. The damper valve also includes two poppets, oriented facing in opposite directions in the central chamber. Each of the poppets has a hollow bore formed therethrough, to always allow fluid flow through the damper valve at a first (minimal) rate. The damper valve also includes a spring extending between the poppets, and normally biasing them against the valve seats.

13 Claims, 4 Drawing Sheets

Laminar Orifice Characteristics

Pressure Drop Caused By Steering Dampers

BI-DIRECTIONAL DAMPER VALVE FOR A HYDRAULIC LINE, POWER STEERING SYSTEM INCORPORATING THE DAMPER VALVE, AND METHODS OF USING SAME

BACKGROUND OF THE INVENTION

1. Field of the Invention

The present invention relates to a bi-directional damper valve for dampening oscillation in a hydraulic system, to a power steering system incorporating the damper valve, and to methods of using the valve. More particularly, the present invention relates to a bi-directional damper valve which includes a main valve body having a hollow passage formed therethrough, and a pair of opposed spring-loaded poppets disposed in a central chamber of the valve body, as well as to a system incorporating the insert, and to methods of using the insert.

2. Description of the Background Art

Power steering is in common use on many cars and trucks sold today.

During operation of a vehicle, a driver can experience some unpleasant feedback sensations at the steering wheel, due to unusual conditions. Examples of some of these unpleasant feedback situations include steering shimmy, brake judder, and tire kickback.

Unwanted steering vibration feedback diminishes driving enjoyment and, hence, affects vehicle marketability. Auto manufacturers have been struggling with this phenomenon for some time, and are constantly looking for ways to improve power steering feel.

A number of different restriction valves are known for use in hydraulic power steering systems. Some of the known restriction valves are designed to try and reduce the unpleasant feedback sensations referred to above.

Some steering system suppliers have designed fluid dampers to place in the steering system, in order to reduce steering vibrations. These known dampers are designed to provide a flow restriction in the lines connecting the gearbox control valve to the gearbox cylinders, in order to resist mechanical movement disturbance of the rack.

Some examples of issued patents relating generally to the fields of power steering stabilizers, hydraulic flow control valves, and related hardware include U.S. Pat. Nos. 3,894,562, 4,285,534, 4,736,962, 5,531,287, 5,697,216, and 6,119,728.

The hydraulic dampers currently used by most automotive companies, in power steering systems for passenger cars and trucks, are similar to each other in design and function. The currently known damper generally consists of a one-way valve and a damping valve with a threshold pressure, and an inlet restrictor to tune the dampening effect. These valves are usually integrated in parallel in a damper housing, to receive flow in opposite directions. Fluid flow in one direction travels through the one-way valve, while fluid flow in the other direction flows through the inlet restrictor.

In the current damper, when the steering wheel is turned, the one-way valve allows the fluid to flow from the power steering high-pressure line into the gearbox cylinders. The damping valve has a threshold pressure to resist return flow from the steering cylinder to the gearbox control valve. By functioning in this way, the known damper adds certain degree of rigidity to the fluid in the cylinder and the rack, when the tie rod receives external mechanical disturbance. Nevertheless, this threshold pressure inevitably adds an extra resistance to normal steering maneuvers, and hence, contributes a drag or friction feeling to normal steering wheel handling.

Although they do have a positive effect in reducing steering vibrations, the current power steering dampers detract from the feeling of normal steering maneuvers, by generating increased resistance to turning, and poor returnability. These negative effects are caused because the characteristics of the current power steering dampers are substantially independent of frequency.

Although the known power steering dampers have some utility for their intended purposes, a need still exists in the art for an improved power steering damper valve, and for a power steering system incorporating such a damper valve. In particular, there is a need for a hydraulic damper valve which will improve normal steering feel, while still providing a beneficial damping effect when needed.

SUMMARY OF THE INVENTION

The present invention, in a selected illustrative embodiment, provides a frequency-dependent and flow-sensitive damper valve, for reducing steering rotational vibration in hydraulic-assisted steering systems.

According to the illustrative embodiment of the invention, a bi-directional damper valve is provided for installation in series in a hydraulic fluid line, to regulate fluid flow therethrough.

The damper valve includes a main valve body, a pair of opposed poppets disposed inside of the main valve body, and a spring extending between the two poppets.

The main valve body of the damper valve is a generally elongated member with a central longitudinal axis, and has a main flow passage formed therethrough. The main body may be substantially cylindrical in shape, or may have a rectangular block shape or other appropriate shape. The main valve body may include two or more pieces assembled together.

The flow passage widens at central portion of the valve body to form a central chamber, which has first and second valve seats formed at opposite ends thereof.

The main valve body also has first and second bypass channels formed therein which are adapted to selectively communicate with the flow passage. The bypass channels branch off a position of the chamber inside of the respective valve seats, and terminate in outlets, located in the flow passage outside of the respective valve seats.

The damper valve according to the first embodiment also includes first and second poppets disposed in the central chamber and facing in opposite directions. The poppets are substantially identical to one another, and each poppet has a hollow bore formed therethrough, to allow at least a minimal amount of fluid to flow through the damper valve at a first rate, when fluid pressure is low, such as during normal steering maneuvers.

The damper valve according to the first embodiment also includes a spring extending between the first and second poppets, and normally biasing the poppets against their respective valve seats. During operation of the damper valve, when higher pressure, sufficient to unseat one of the poppets, is applied against the biasing force of the spring, fluid may partially bypass the poppets, and flow through the damper valve at a second rate which is greater than the first rate.

The present invention also provides a power steering system for a vehicle, in which the system incorporates the described damper valve in a fluid flow line thereof.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Herein, only structures considered necessary for clarifying the present invention are described. Other conventional structures, and those of ancillary and auxiliary components of the system, are assumed to be known and understood by those skilled in the art.

The present invention, in a first embodiment, provides a bi-directional damper valve which is usable in hydraulic-assisted steering systems as a frequency-dependent and flow-sensitive damper for reducing steering rotational vibration.

Figure 1:
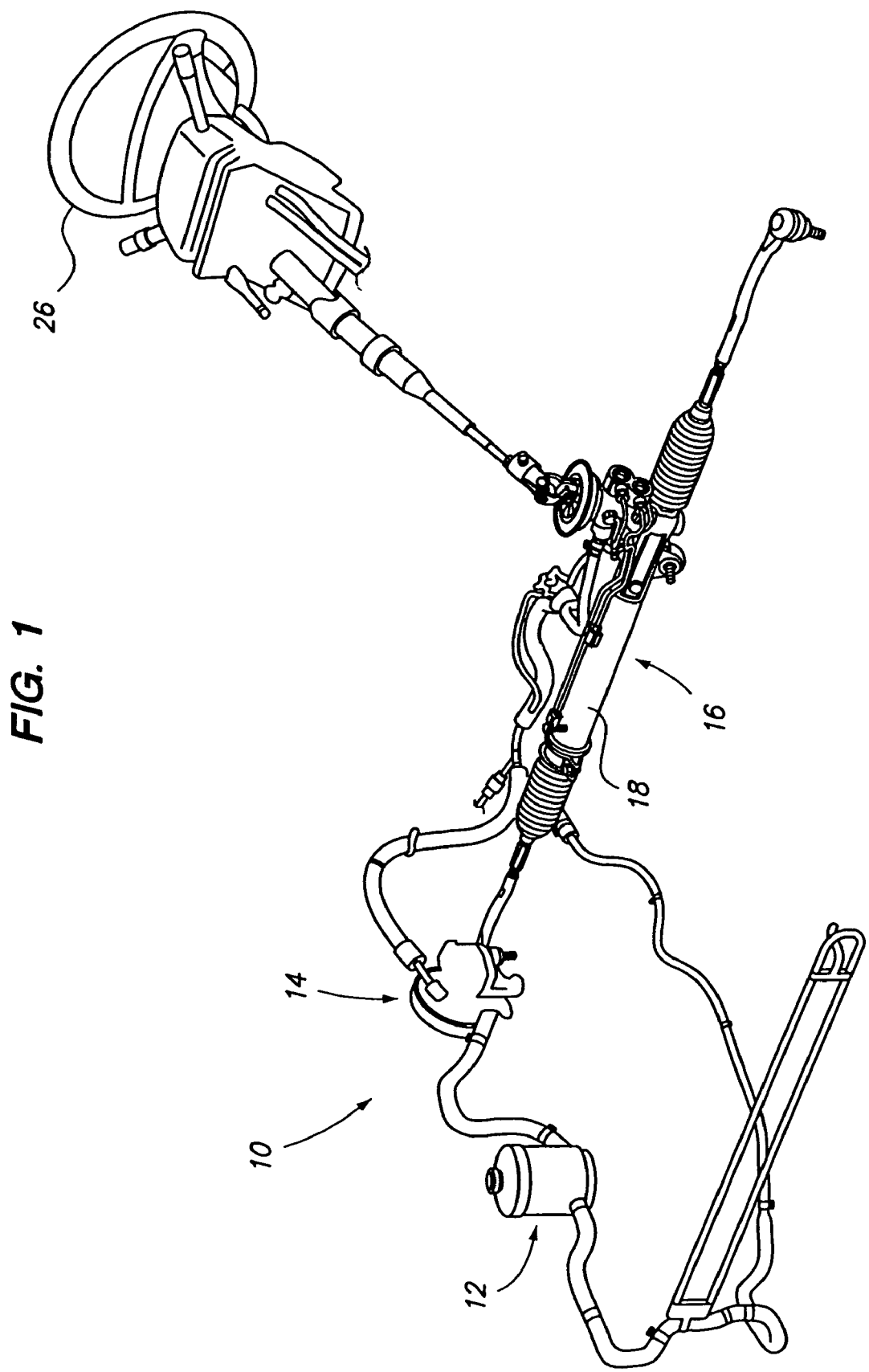
FIG. 1 is a simplified perspective view showing the main components of a vehicular power steering system.

Referring now to the drawings, FIG. 1 is a simplified perspective view showing the main components of a power steering system 10 for a vehicle.

Figure 2:
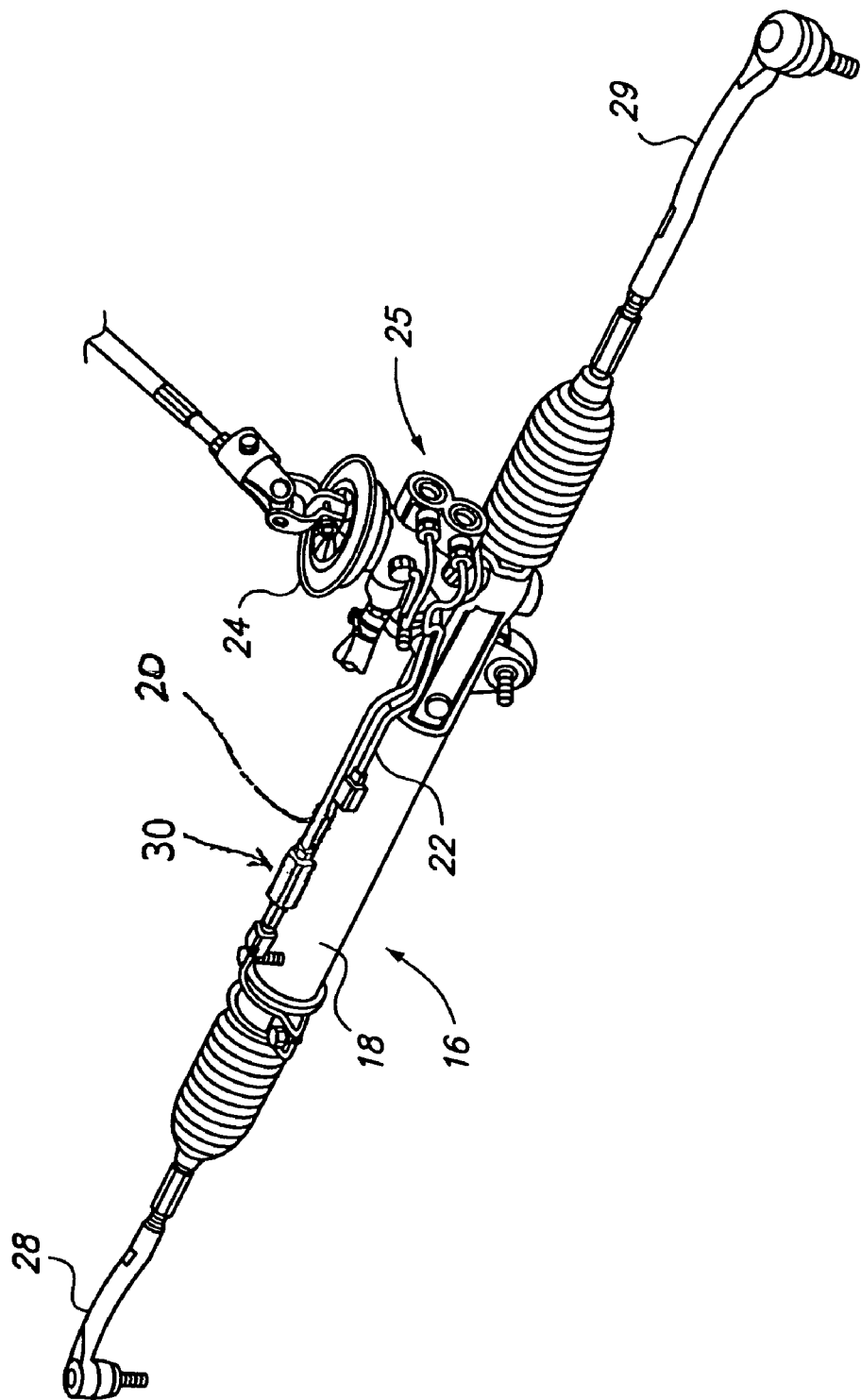
FIG. 2 is a perspective view of a rack and pinion which is a component of the system of FIG. 1, also showing a gearbox control valve and part of a steering shaft.

The system 10 includes a fluid reservoir 12, a fluid pump 14, and a rack and pinion assembly 16 including a power cylinder 18. The system 10 further includes hydraulic fluid lines 20, 22 (FIG. 2) for alternately supplying hydraulic fluid to opposite sides of the power cylinder 18, depending on the input to the pinion shaft 24, based on which direction the steering wheel 26 is turned. Fluid flow through the fluid lines 20, 22 is controlled by a gearbox control valve 25, which is shown surrounding and enclosing the pinion shaft 24.

The direction of fluid flow through the system 10 is reversible, and depends on which direction the steering wheel 26 is being turned at a given time.

When unexpected bumps or negative feedback is encountered during driving, forces can be transmitted from the tie rods 28, 29, through the power cylinder 18 and the gearbox control valve 25, to the steering wheel. This negative feedback can be reduced by the placement of a damper valve 30 into the hydraulic circuit. The damper valve 30 is installed in fluid communication with one of the hydraulic fluid lines 20, 22 of the power cylinder 18.

The damper valve 30 hereof can be used to reduce steering rack and pinion vibration and hence, the steering wheel vibrations excited by external mechanical disturbances acting on the tie rods 28, 29 (such as steering shimmy, brake judder, and tire kickback).

The damper valve 30 is made bidirectional because the fluid flow in a power steering system can reverse directions. The damper valve 30 can be inserted anywhere along the hydraulic connection lines 20 or 22 connecting the gearbox control valve 25 and the power cylinder 18.

The damper valve 30, according to the illustrative embodiment includes a main valve body 32, a pair of opposed poppets 50, 52 housed in a chamber formed in the main valve body, and a spring 70 extending between the poppets.

Figure 3:
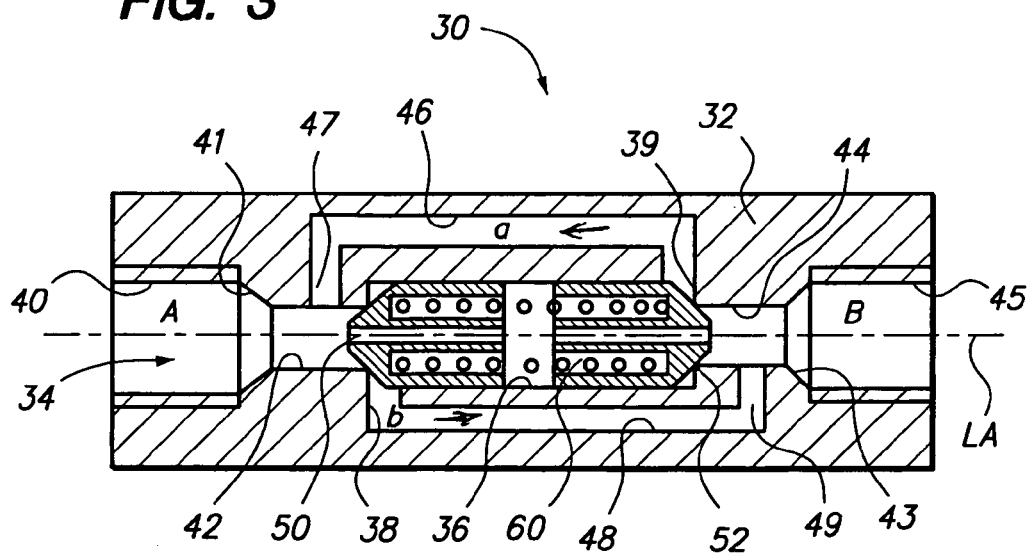
FIG. 3 is a cross-sectional view of a damper valve according to a selected illustrative embodiment of the present invention.

The main valve body 32 is an elongated member with a longitudinal axis shown at LA in FIG. 3. The main valve body 32 may be substantially cylindrical in external shape, or may be made in a rectangular block shape or other suitable shape. The main valve body may include two or more pieces assembled together, to make it easier to fit the poppets 50, 52 and spring 70 therein.

The main valve body 32 has a flow passage 34 formed axially therethrough. The flow passage 34 widens at central portion of the main valve body 32 to form a central chamber 36, which has first and second valve seats 38, 39 formed at opposite ends thereof.

The flow passage 34 includes a first end portion 40, having a first diameter and having female threads formed therein, used to connect the damper valve 30 to hydraulic lines.

The flow passage 34 also includes a first intermediate portion 42, connected to the first end portion and having a second diameter which is smaller than the first diameter, as shown. The enlarged-diameter central chamber 36 is connected to the first intermediate portion 42.

The flow passage 34 further has a second intermediate portion 44, connected to the central chamber 36 opposite the first intermediate portion 42, and having a diameter substantially equal to the second diameter. The flow passage 34 further has a second end portion 45, connected to the second intermediate portion 44, and having a diameter substantially equal to the first diameter. The second end portion 45 has female threads formed therein, used to connect the damper valve 30 to hydraulic lines.

The first valve seat 38 is defined at the junction between the central chamber 36 and the first intermediate portion, and the second valve seat 39 is defined at the junction between the central chamber 36 and the second intermediate portion 44.

As shown in FIG. 3, the flow passage 34 tapers substantially conically outwardly at opposed flared portions 41, 43 extending on opposite sides of the valve body 32, between the respective intermediate portions 42, 44 and the respective enlarged diameter portions 40, 45.

The main valve body 32 also has first and second bypass channels 46, 48 formed therein which are adapted to selectively communicate with the flow passage 34. As shown in FIG. 3, the bypass channels 46, 48 each respectively branch off the central chamber 36, inside of the respective valve seats. It will be further seen in the drawing that the bypass channels 46, 48 each have a respective inlet adjacent the corresponding valve seat 38 or 39, and an outlet 47, 49 located outside of the opposite valve seat. Directions of flow through the bypass channels 46, 48 are shown by arrows in the drawing, although it will be understood that fluid will flow through only one of the bypass channels at any given time, and will only enter the bypass channel after displacing the associated poppet when pressure exceeds a critical limit.

The damper valve 30, according to the first embodiment, also includes the first and second poppets 50, 52 disposed in the central chamber 36 and facing in opposite directions.

The poppets 50, 52 are substantially identical to one another, and each has a respective hollow bore 54, 56 formed therethrough, to allow fluid flow through the damper valve 30 at a first rate.

Figure 4:
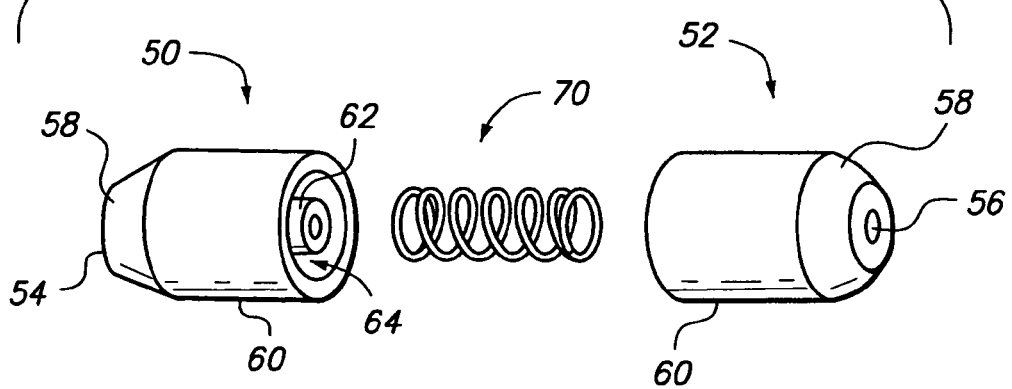
FIG. 4 is an exploded perspective detail view showing internal components of the damper valve of FIG. 3.

As seen best in FIG. 4, each respective poppet 50, 52 includes a conically tapered end seal portion 58 with a central bore, such as that shown at 56, formed therein. Each poppet 50, 52 also includes a substantially cylindrical skirt 60 integrally attached to the end seal portion, and a hollow central tube 62 coaxially disposed within the skirt. The central tube 62 is integrally attached to the end seal portion 58, and is in fluid communication with the central bore. The skirt 60 and the central tube 62 define a cylindrical recess 64 therebetween, said cylindrical recess defining a spring seat.

The damper valve 30 according to the first embodiment also includes a spring 70 extending between the first and second poppets 50, 52, and the spring normally biases the poppets against their respective valve seats 38, 40.

During operation of the damper valve 30, when fluid pressure, sufficient to unseat one of the poppets 50, 52, is applied against the biasing force of the spring 70, fluid may partially bypass the poppet and flow through the damper valve at a second rate, which is greater than the first rate allowed via the poppet bores 54, 56.

The present invention also provides a power steering system 10 for a vehicle, in which the system incorporates the described damper valve 30 in a fluid flow line 20 and/or 22 thereof.

In the hydraulic damper valve according to the present invention, the laminar orifices 54, 56 in the poppets 50, 52 are specially designed to achieve desirable frequency-dependent fluid resistance, for attenuating steering rotational vibrations caused by high-frequency external mechanical disturbance acting on the steering rack or tie rod, while the fluid resistance during normal steering maneuvers is limited to a low level. Accordingly, using the damper valve 30 hereof, the steering friction and the influence on steering wheel returnability are minimized.

The properly pre-loaded spring 70, together with the poppets 50, 52, constitutes a bi-directional dual check valve assembly, to allow fluid flow to partially by-pass the poppet orifices 54, 56 under certain conditions. These two check valves are provided in the damper valve 30 to improve the performance of quick steering turning.

Although not wishing to be bound by any theory, the following discussion is offered in the way of one possible theoretical basis for the improved steering performance experienced using the damper valve 30 according to an embodiment of the present invention.

Freguency Dependence

The damper valve 30 according to an embodiment of the invention can achieve desirable fluid resistance for attenuating steering rotational vibrations caused by exciting force acting on the steering rack and, meanwhile, solve the problem of high friction experienced using the current damper, based on frequency-dependent impedance characteristics of the laminar orifices 54, 56 of the respective poppets 50, 52.

Figure 5:
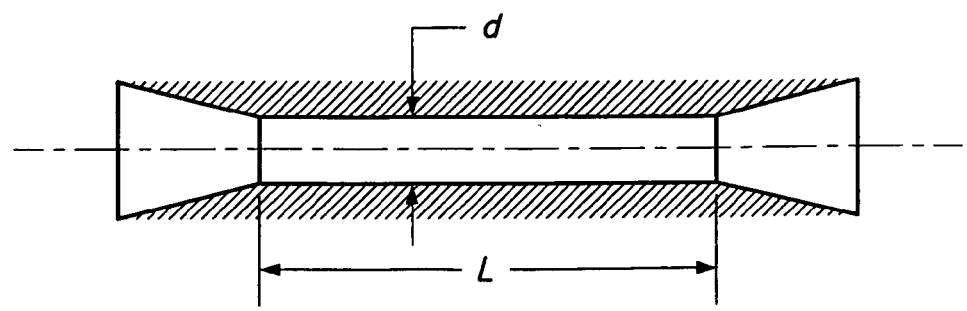
FIG. 5 is a simplified diagram of an orifice-type damper valve having outwardly flared end portions.

Consider a pressure disturbance PI occurring at the left side of a laminar orifice with a length of L and an inside diameter of d where L>>d, as shown in FIG. 5. At the right side, it is assumed that there is no pressure disturbance. Then, the entry impedance, that is, the ratio of the dynamic pressure PI to the dynamic flow QI, at the left side of the orifice, can be approximately derived as:

$$Z = PI/QI = jZc^* \sin(BL)/\cos(BL) \quad (1)$$

where Zc and B are the characteristic impedance and the wave propagation coefficient of the laminar orifice separately, and they are functions of the length and the diameter of the orifice, for a given fluid and temperature.

The entry impedance represents how much resistance there will be for the flow going into the orifice under a certain level of pressure disturbance. It is nonlinearly dependent on the frequency of the disturbance.

Figure 6:
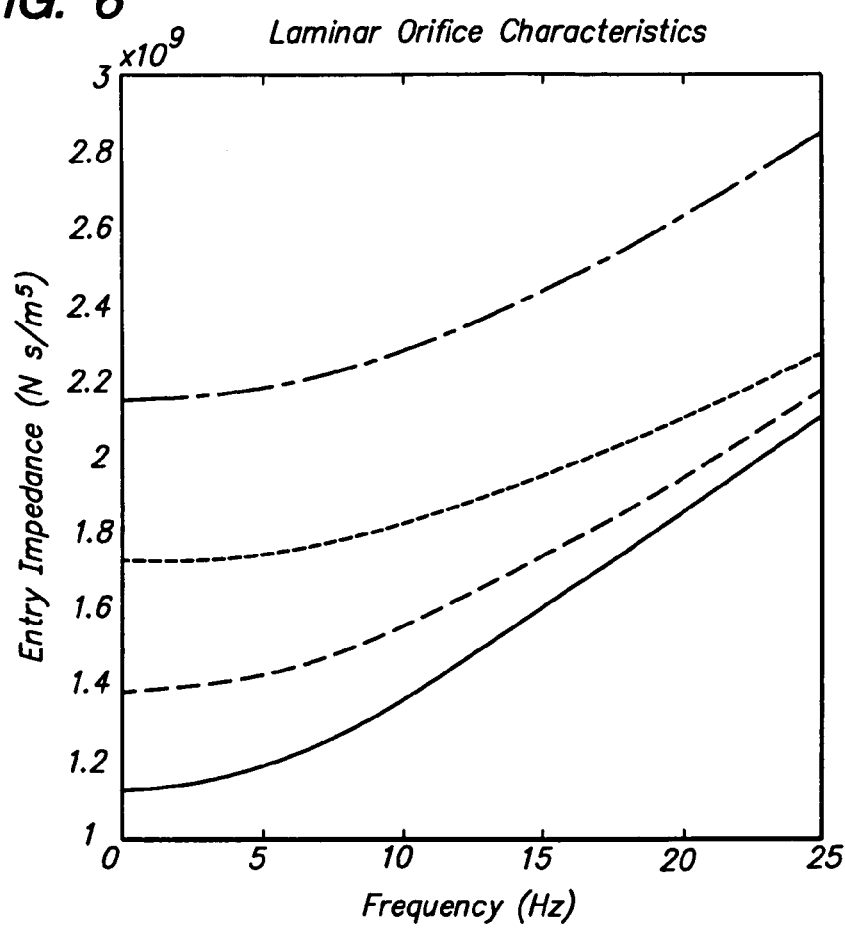
FIG. 6 is a graph showing the relation between frequency and entry impedance in the damper valve of FIG. 5.

FIG. 6 shows the example results of the frequency-dependence of four different laminar orifices with different dimensions.

The figure indicates that the amplitude of the entry impedance at lower frequencies is always lower than that at higher frequencies. Based on these characteristics, the damper valve 30 according to the present invention can be tuned to minimize the resistance or friction feeling in the frequency range of normal steering maneuver (<2 Hz), while still providing high resistance in the frequency range of external mechanical disturbance (>10 Hz).

Flow Sensitivity

The damper valve 30 according to the invention is further designed to reduce or eliminate the potential negative limitations of the orifice on high-frequency/high-speed turning performance.

The damper valve 30, including the properly pre-loaded spring 70 together with the poppets 50, 52, includes two check valves to allow flow to partially by-pass the poppet orifices 54, 56 under certain conditions. These two check valves are provided in the damper valve 30 to improve the performance of high-speed steering turning.

When the driver turns the steering wheel 26 very fast under certain circumstances, such as emergency turning, the flow rate going through the gearbox connection pipes 20, 22 is significantly increased.

As an example, assume that the flow enters Chamber A and exits Chamber B of the damper valve 30 shown in FIG. 3. With the increase of flow rate, the pressure drop from the left-hand side to the right-hand side of the first poppet 50 increases. When the pressure drop reaches a setting point, the poppet 50 is pushed open, and that allows the flow to partially by-pass the orifice 54 and to flow directly to chamber B through the bypass channel (b).

It is well known that in a dynamically operated power steering system, the direction of fluid flow often reverses. Accordingly, the damper valve 30 according to the first embodiment hereof is designed to be substantially symmetrical, so that it has identical performance for either direction of flow.

When using the damper valve 30 hereof under high-speed turning, high fluid resistance of the orifices is prevented, hydraulic assistance force for steering is guaranteed, and normal turning performance of the steering system is maintained.

Example Data Showing the Effect of the Invention

Static Pressure Drop Across a Damper

Figure 7:
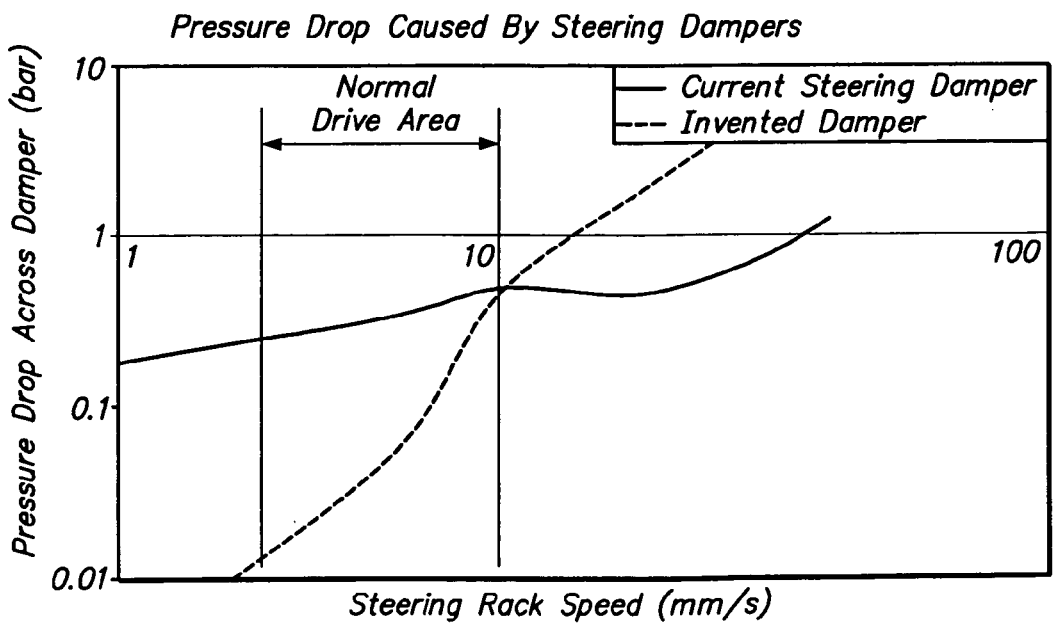
FIG. 7 is a graph showing the relation between pressure drop and steering rack speed in a power rack-and-pinion steering system, contrasting two different dampers.

The pressure drop across a damper is directly related to steering friction feeling. It is desirable to have low pressure drop to achieve low friction feeling during normal drive maneuver. FIG. 7 shows a comparison of measured static pressure drops across the current damper and the newly invented damper. It is shown that the invented damper is advantageous over the current damper, because the invented damper yields much lower pressure drop for the normal drive area.

Although the present invention has been described herein with respect to a specific illustrative embodiment thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A bi-directional damper valve for connecting to a hydraulic line to regulate fluid flow therethrough, said damper valve comprising:
   a main valve body having a longitudinal axis and having an axial flow passage formed therethrough which widens at central portion of the valve body to form a central chamber with first and second valve seats formed at opposite ends of said central chamber,
   said main valve body also having first and second bypass channels formed therein which are adapted for selective placement in fluid communication with said flow passage, said first bypass channel branching off the central chamber inside of said first valve seat, and said second bypass channel branching off the central chamber inside of said second valve seat;
   first and second poppets disposed in said central chamber and facing in opposite directions, said first and second poppets being substantially identical to one another and having respective hollow bores formed therethrough to allow fluid flow at a first rate through the valve; and
   a spring extending between said first and second poppets and normally biasing the poppets against their respective valve seats;
   wherein said damper valve is configured so that when fluid pressure, greater than the biasing force of said spring, displaces one of said poppets from its associated valve seat, fluid is allowed to flow through the damper valve at a second rate which is greater than the first rate.

2. The damper valve of claim 1, wherein said valve body is configured so that opposite end portions of the axial flow passage are flared outwardly in opposite directions to form enlarged-diameter portions.

3. The damper valve of claim 2, wherein said main valve body is configured so that said axial flow passage tapers substantially conically outwardly between said valve seats and said enlarged diameter portions.

4. The damper valve of claim 1, wherein each of said poppets comprises a tapered end seal portion with a central bore formed therein, a substantially cylindrical skirt integrally attached to the end seal portion, and a hollow central tube integrally attached to the end seal portion and in fluid communication with the central bore, wherein said skirt and said central tube define a cylindrical recess therebetween.

5. The damper valve of claim 1, wherein said spring is a cylindrical coil spring.

6. The damper valve of claim 1, wherein said main valve body is made from a plurality of pieces assembled together.

7. A power steering system for a vehicle, comprising a fluid line having the damper valve of claim 1 connected in fluid communication therewith.

8. A damper valve for connecting to a hydraulic line to regulate fluid flow therethrough, said damper valve comprising:
   a main valve body having a longitudinal axis and having an axial flow passage formed therethrough, said flow passage including a first end portion having a first diameter, a first intermediate portion connected to the first end portion and having a second diameter which is smaller than the first diameter, and an enlarged-diameter central chamber connected to the first intermediate portion;
   said flow passage further having a second intermediate portion connected to the central chamber opposite the first intermediate portion and having a diameter substantially equal to the second diameter, said flow passage further having a second end portion connected to the second intermediate portion and having a diameter substantially equal to the first diameter,
   wherein a first valve seat is defined between said central chamber and said first intermediate portion, and a second valve seat is defined between said central chamber and said second intermediate portion;
   said main valve body also having first and second bypass channels formed therein and selectively placeable in fluid communication with said flow passage, said first bypass channel branching off the flow passage inside of said first valve seat, and said second bypass channel branching off the flow passage inside of said second valve seat;
   a first poppet disposed within the hollow chamber of said valve body, said first poppet having a hollow body with a first end for sealing placement against the first valve seat and a second end opposite said first end and with an opening formed therein, said first poppet having a hollow bore formed therethrough to allow fluid flow at a first rate through the poppet, said first poppet further having a spring seat formed internally inside said first end;
   a second poppet disposed in the hollow chamber of said valve body and oriented substantially opposite said first poppet, said second poppet being substantially identical to the first poppet and having a first end for sealing placement against the second valve seat;
   a spring disposed in the chamber of said valve body and having a first end engaging said first poppet and seated on the spring seat thereof to bias said first poppet against said first valve seat to resist fluid flow through said first bypass channel, said spring having a second end engaging said second poppet and seated on the spring seat thereof to bias said second poppet against said second valve seat to resist fluid flow through said second bypass channel.

9. The damper valve of claim 8, wherein said main valve body is configured so that said axial flow passage tapers substantially conically outwardly at respective areas thereof between said intermediate portions and said end portions.

10. The damper valve of claim 8, wherein each of said poppets comprises a tapered end seal portion with a central bore formed therein, a substantially cylindrical skirt integrally attached to the end seal portion, and a hollow central tube integrally attached to the end seal portion and in fluid communication with the central bore, wherein said skirt and said central tube define a cylindrical recess therebetween, said cylindrical recess defining a spring seat.

11. The damper valve of claim 8, wherein said spring is a cylindrical coil spring.

12. The damper valve of claim 8, wherein said main valve body wherein said main valve body is made from a plurality of pieces assembled together.

13. A power steering system for a vehicle, comprising a fluid line having the damper valve of claim 8 connected in fluid communication therewith.

* * * * *